(12) United States Patent
Tamaki et al.

(10) Patent No.: US 7,576,140 B2
(45) Date of Patent: Aug. 18, 2009

(54) METHOD OF IMPROVING ABRASION RESISTANCE OF PLASTIC ARTICLE AND ARTICLE PRODUCED THEREBY

(75) Inventors: Ryo Tamaki, Clifton Park, NY (US); Steven Thomas Rice, Scotia, NY (US); Hieu Minh Duong, Clifton Park, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 663 days.

(21) Appl. No.: 11/253,115

(22) Filed: Oct. 18, 2005

(65) Prior Publication Data

US 2007/0088094 A1    Apr. 19, 2007

(51) Int. Cl.
C08F 2/46 (2006.01)
C08J 3/28 (2006.01)
B32B 27/00 (2006.01)
B32B 27/16 (2006.01)
B32B 27/28 (2006.01)

(52) U.S. Cl. .......... 522/111; 522/109; 522/110; 522/112; 522/99; 522/148; 522/162; 522/163; 522/172; 522/183; 428/411.1; 428/412; 428/446; 428/447; 428/451

(58) Field of Classification Search ........ 522/99, 522/163, 148, 109, 111, 110, 112, 162, 172; 428/412, 411.1, 446, 447, 451
See application file for complete search history.

(56) References Cited

U.S. PATENT DOCUMENTS

| 3,652,710 | A |   | 3/1972 | Holub et al. |   |
|---|---|---|---|---|---|
| 3,770,697 | A | * | 11/1973 | Holub et al. | 528/203 |
| 3,986,997 | A |   | 10/1976 | Clark |   |
| 4,027,073 | A |   | 5/1977 | Clark |   |
| 4,110,185 | A |   | 8/1978 | Williams et al. |   |
| 4,238,596 | A |   | 12/1980 | Quinn |   |
| 4,238,597 | A |   | 12/1980 | Markezich et al. |   |
| 4,239,798 | A |   | 12/1980 | Schroeter et al. |   |
| 4,410,594 | A |   | 10/1983 | Olson |   |
| 4,503,126 | A |   | 3/1985 | Phillips et al. |   |
| 4,720,518 | A | * | 1/1988 | Chihara et al. | 524/267 |
| 4,749,738 | A |   | 6/1988 | Boutni |   |
| 5,318,827 | A |   | 6/1994 | Logan et al. |   |
| 5,681,905 | A |   | 10/1997 | Mason et al. |   |
| 5,998,028 | A |   | 12/1999 | Eckart et al. |   |
| 6,294,647 | B1 |   | 9/2001 | Brunelle et al. |   |
| 6,306,507 | B1 |   | 10/2001 | Brunelle et al. |   |
| 6,492,481 | B1 |   | 12/2002 | Davis et al. |   |
| 6,596,843 | B2 |   | 7/2003 | Brunelle et al. |   |
| 6,945,656 | B2 | * | 9/2005 | Takahashi et al. | 359/601 |
| 7,128,428 | B2 | * | 10/2006 | Takahashi et al. | 359/601 |
| 7,253,215 | B2 | * | 8/2007 | Takahashi et al. | 522/110 |

FOREIGN PATENT DOCUMENTS

| EP | 1223184 A1 | 7/2002 |
|---|---|---|
| JP | 01075521 | 3/1989 |
| JP | 02191618 | 7/1990 |
| JP | 02208325 | 8/1990 |
| JP | 03296536 | 12/1991 |
| JP | 5047214 A | 2/1993 |
| JP | 2001162732 A | 6/2001 |

OTHER PUBLICATIONS

PCT International Search Report dated Apr. 23, 2007.

* cited by examiner

Primary Examiner—Sanza L McClendon

(57) ABSTRACT

The invention includes embodiments that relate to a method of improving the abrasion resistance of a plastic article. The method comprises: (a) providing a composition comprising at least one siloxane compound and at least one thermoplastic polymeric material; (b) forming an article from the composition of step (a); and (c) exposing the article formed in step (b) to an energy source selected from an electron beam source, a gamma radiation source, and a combination thereof. The invention also includes embodiments that relate to an article comprising an abrasion resistant surface.

22 Claims, 7 Drawing Sheets

METHOD OF IMPROVING ABRASION RESISTANCE OF PLASTIC ARTICLE AND ARTICLE PRODUCED THEREBY

BACKGROUND

The invention includes embodiments that relate to a method of improving the abrasion resistance of a plastic article. The invention also includes embodiments that relate to an article comprising an abrasion resistant surface.

Thermoplastic polymers such as polycarbonate (PC) and resorcinol polyarylate-polycarbonate copolymers (SLX) are prone to scratch and mar type damage. The susceptibility of a polymer to scratching or marring can severely limit its utility in commercial applications requiring a scratch-free or mar-free appearance.

To avoid or at least minimize scratch and mar damage, hard coatings have been applied on the surface of a variety of polymers, especially polycarbonate. This technique has been utilized advantageously in several areas such as glazing applications. Although the application of a hard coating on the surface of a polymer provides in some instances improved abrasion resistance, the application of the hard-coat introduces additional process steps and tends to increase the processing time and cost. In addition, once a hard-coat is in contact with the surface (for example, the surface of a polycarbonate film), post-processing options are limited due to the presence of the hard-coat. Additional limitations are encountered as articles comprising a hard-coated polymer "weather" and the hard-coat erodes from the polymer surface, and the polymer once again becomes susceptible to scratching and marring. Additionally, hard-coats adhering to a polymer surface may delaminate.

Therefore, enhancement of the abrasion resistance of the parent thermoplastic polymers, especially that of parent PC and SLX polymers, represents a highly desirable objective. Moreover, plastic articles derived from these thermoplastic polymers having improved abrasion properties are also desired.

BRIEF DESCRIPTION

In one embodiment, the present invention provides a method for improving the abrasion resistance of a plastic article. The method comprises: (a) providing a composition comprising at least one siloxane compound and at least one thermoplastic polymeric material; (b) forming an article from the composition of step (a); and (c) exposing the article formed in step (b) to an energy source selected from an electron beam source, a gamma radiation source, or a combination thereof; wherein said thermoplastic polymeric material is not itself an organosilicon polymer.

In a second embodiment, the invention provides a method for improving the abrasion resistance of a plastic article comprising at least one thermoplastic polymeric material selected from the group consisting of polycarbonates, co-polycarbonates, and co-polyestercarbonates. The method comprises: (a) providing a composition comprising at least one siloxane compound and at least one thermoplastic polymeric material selected from the group consisting of polycarbonates, co-polycarbonates, and co-polyestercarbonates; (b) forming an article from the composition of step (a); and (c) exposing the article formed in step (b) to an electron beam source.

In a third embodiment, the invention provides a method for improving the abrasion resistance of a plastic article comprising decamethylcyclopentasiloxane and at least one resorcinol-based polyarylate-polycarbonate copolymer. The method comprises: (a) providing a composition comprising decamethylcyclopentasiloxane and at least one resorcinol-based polyarylate-polycarbonate copolymer; (b) forming an article from the composition of step (a); and (c) exposing the article formed in step (b) to an electron beam source.

In one embodiment, the invention provides a plastic article comprising an abrasion resistant surface; wherein said article is prepared by a method comprising: (a) providing a composition comprising at least one siloxane compound and at least one thermoplastic polymeric material selected from the group consisting of polycarbonates, co-polycarbonates, and co-polyestercarbonates; (b) forming an article from the composition provided in step (a); and (c) exposing the article formed in step (b) to an electron beam source.

DETAILED DESCRIPTION

Figure 1:
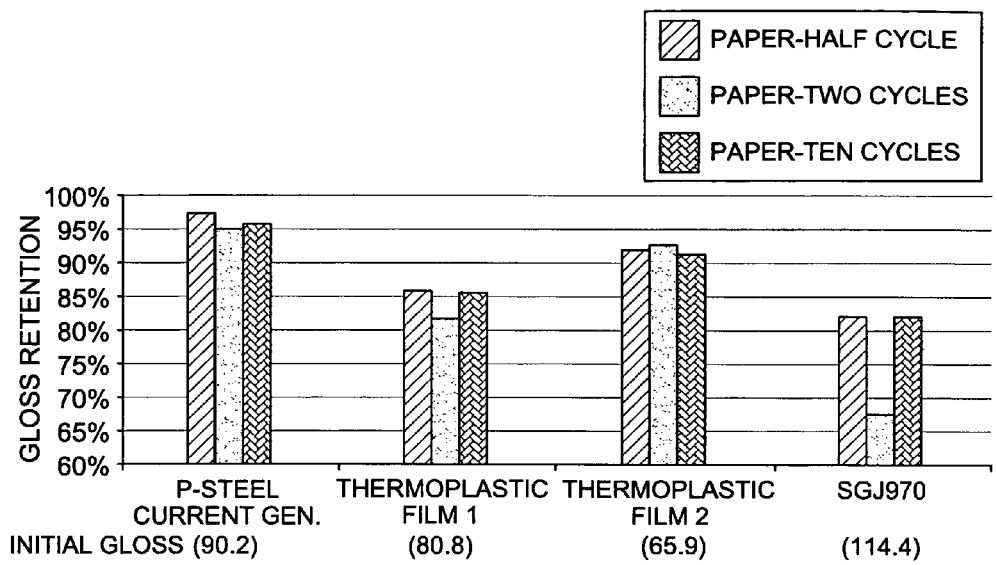
FIG. 1 presents gloss retention results obtained after mar tests for Comparative Examples 1, 5, 6 and 7, in accordance with one embodiment of the invention.

In the following specification and the claims which follow, reference will be made to a number of terms which shall be defined to have the following meanings.

The singular forms "a", "an" and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. In some instances, the approximating language may correspond to the precision of an instrument for measuring the value.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —$OPhC(CF_3)_2PhO$—), 4-chloromethylphen-1-yl, 3-trifluorovinyl-2-thienyl, 3-trichloromethylphen-1-yl (i.e., 3-$CCl_3Ph$-), 4-(3-bromoprop-1-yl)phen-1-yl (i.e., 4-$BrCH_2CH_2CH_2Ph$-), and the like. Further examples of aromatic radicals include 4-allyloxyphen-1-oxy, 4-aminophen-1-yl (i.e., 4-$H_2NPh$-), 3-aminocarbonylphen-1-yl (i.e., $NH_2COPh$-), 4-benzoylphen-1-yl, dicyanomethylidenebis(4-phen-1-yloxy) (i.e., —$OPhC(CN)_2PhO$—), 3-methylphen-1-yl, methylenebis(4-phen-1-yloxy) (i.e., —$OPhCH_2PhO$—), 2-ethylphen-1-yl, phenylethenyl, 3-formyl-2-thienyl, 2-hexyl-5-furanyl, hexamethylene-1,6-bis(4-phen-1-yloxy) (i.e., —$OPh(CH_2)_6PhO$—), 4-hydroxymethylphen-1-yl (i.e., 4-$HOCH_2Ph$-), 4-mercaptomethylphen-1-yl (i.e., 4-$HSCH_2Ph$-), 4-methylthiophen-1-yl (i.e., 4-$CH_3SPh$-), 3-methoxyphen-1-yl, 2-methoxycarbonylphen-1-yloxy (e.g., methyl salicyl), 2-nitromethylphen-1-yl (i.e., 2-$NO_2CH_2Ph$), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}$—), and the like. Further examples of cycloaliphatic radicals include 4-allyloxycyclohex-1-yl, 4-aminocyclohex-1-yl (i.e., $H_2NC_6H_{10}$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OC_6H_{10}C(CN)_2C_6H_{10}O$—), 3-methylcyclohex-1-yl, methylenebis(cyclohex-4-yloxy) (i.e., —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}O$—), 4-hydroxymethylcyclohex-1-yl (i.e., 4-$HOCH_2C_6H_{10}$—), 4-mercaptomethylcyclohex-1-yl (i.e., 4-$HSCH_2C_6H_{10}$—), 4-methylthiocyclohex-1-yl (i.e., 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e., $NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_{10}$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilylpropyl (i.e., $(CH_3O)_3SiCH_2CH_2CH_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH2)_9$-) is an example of a $C_{10}$ aliphatic radical.

As used herein, the term "abrasion resistance" refers to the resistance of a material to remain unimpaired by mechanical action, such as rubbing, scraping or erosion; impact; or pressure. The abrasion may result in loss in weight or a loss in gloss of the surface. The term abrasion resistance encompasses mar resistance and scratch resistance.

As noted, in one aspect the present invention provides a method for improving the abrasion resistance of a plastic article. The method comprises: (a) providing a composition comprising at least one siloxane compound and at least one thermoplastic polymeric material; (b) forming an article from the composition of step (a); and (c) exposing the article formed in step (b) to an energy source selected from an electron beam source, a gamma radiation source, and a combination thereof; wherein said thermoplastic polymeric material is not itself an organosilicon polymer.

Without being bound by any theory, it is believed that the siloxane compound acts as a cross-linking promoter and may cross-link to itself and the thermoplastic polymeric material on exposure to an energy beam source. The siloxane compounds may be used as cross-linking promoters for any thermoplastic polymeric material known to one of ordinary skill in the art. As used herein, the term "thermoplastic polymeric material" refers to a material with a macromolecular structure that will repeatedly soften when heated and harden when cooled. Illustrative examples of thermoplastic polymeric materials suitable for the method of the present invention include, but are not limited to, olefin-derived polymers, for example, polyethylene, polypropylene, and their copolymers; polymethylpentane-derived polymers, polybutadiene, polyisoprene, and their copolymers; polymers of unsaturated carboxylic acids and their functional derivatives, for example, acrylic polymers such as poly(alkyl acrylates), poly(alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-6,6, nylon-1,1, and nylon-1,2; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly (butylene naphthalate) (hereinafter sometimes designated "PBN"), poly(cyclohexanedimethanol terephthalate), poly (cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketones; and copolymers thereof.

In one embodiment, the thermoplastic polymeric material is selected from the group consisting of polyesters such as PETs, PBTs, polysulfones, polyethersulfones, polyimides, polyetherimides, polyetherketones, polyetheretherketones, polyphenylene ethers, polycarbonates, co-polycarbonates, co-polyestercarbonates, and copolymers thereof. In an alternate embodiment, the thermoplastic polymer is selected from the group consisting of polycarbonates, co-polycarbonates, and co-polyestercarbonates.

Thus, in one embodiment, the present invention provides a method for improving the abrasion resistance of a plastic article comprising at least one of a polycarbonate, a co-polycarbonate, or a co-polyestercarbonate. The method comprises: (a) providing a composition comprising at least one siloxane compound and at least one thermoplastic polymeric material selected from the group consisting of polycarbonates, co-polycarbonates, and co-polyestercarbonates; (b) forming an article from the composition of step (a); and (c) exposing the article formed in step (b) to an electron beam source.

In one embodiment, the siloxane compound is selected from the group consisting of cyclic siloxanes, linear siloxanes, and branched siloxanes.

In one embodiment, the siloxane compound comprises at least one cyclic siloxane having formula (I):

wherein "n" is an integer from 3 to 1000; and $R^1$ and $R^2$ are independently at each occurrence a hydrogen atom, a $C_1$-$C_{20}$ aliphatic radical, a $C_3$-$C_{40}$ aromatic radical, or a $C_3$-$C_{40}$ cycloaliphatic radical.

In one embodiment, both $R^1$ and $R^2$ in formula (I) are $C_1$-$C_{20}$ aliphatic radicals which may be the same or different. In one embodiment, the cyclic siloxane I comprises at least one of octamethylcyclotetrasiloxane, decamethylcyclopentasiloxane, dodecamethylcyclohexasiloxane, or 1,3,5,7-tetravinyl-1,3,5,7-tetramethylcyclotetrasiloxane. In one embodiment, the cyclic siloxane I comprises decamethylcyclopentasiloxane. Cyclic siloxanes of different molecular weight and with different functionalities are commercially available from Gelest Inc., Morrisville Pa., USA. Without being bound by any theory, it is believed that the cyclic siloxanes exhibit enhanced miscibility with the thermoplastic polymeric material relative to non-cyclic siloxanes and may enable preparation of more highly transparent films or coatings, which may be desirable for a particular application such as automotive applications.

In one embodiment, the siloxane compound comprises a silsesquioxane, having formula (II);

 (II)

wherein "n" is an even integer from 2 to 100; and $R^3$ is independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety.

In one embodiment, the silsesquioxane (II) comprises at least one of methyl silsesquioxane, phenyl silsesquioxane, phenylethyl silsesquioxane, or polyphenylsilsesquioxane. Methyl silsesquioxane exemplifies silsesquioxane of formula (II), wherein $R^3$ is a methyl radical. Phenyl silsesquioxane exemplifies silsesquioxane of formula (II), wherein $R^3$ is a phenyl radical. Phenylethyl silsesquioxane exemplifies silsesquioxane of formula (II), wherein $R^3$ is a phenylethyl radical. Phenyl polysilsesquioxane exemplifies silsesquioxane of formula (II), wherein $R^3$ is a phenyl radical and "n" is greater than 20.

In one embodiment, the silsesquioxanes comprise fully condensed polyhedral oligosilsesquioxane (POSS) frameworks comprising 6, 8, 10, or 12 Si atoms. The silsesquioxane framework is built upon Si—O linkages and clusters. Some of the fully condensed polyhedral oligosilsesquioxane (POSS) frameworks exemplifying embodiments of the invention include, but are not limited to, silsesquioxanes of formulae (III), (IV), or (V);

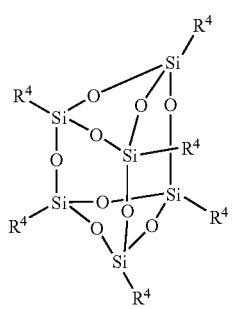 (III)

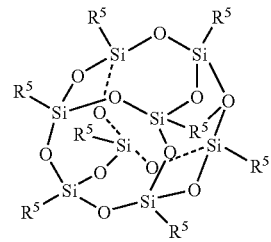 (IV)

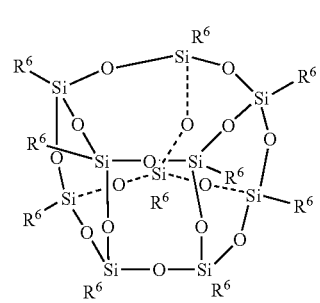 (V)

wherein $R^4$, $R^5$ and $R^6$ are independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety.

In one embodiment, the siloxane compound comprises a silsesquioxane, having formula (VI);

 (VI)

wherein "n" is an integer from 2 to 100: "m" is an integer from 0 to 100: with the proviso that the sum of n+m is an even integer; and $R^3$ is independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety. Formula II falls within general formula VI and represents a special case wherein n is an even integer from 2 to 100 and m is 0.

In one embodiment, the silsesquioxanes comprise partially condensed polyhedral oligosilsesquioxane (POSS) frameworks comprising 4 to 12 Si atoms. The silsesquioxane framework is built upon Si—O linkages and clusters. Some of the partially condensed polyhedral oligosilsesquioxane (POSS) frameworks exemplifying embodiments of the invention include, but are not limited to, silsesquioxanes of formulae (VII), (VIII), (IX), or (X);

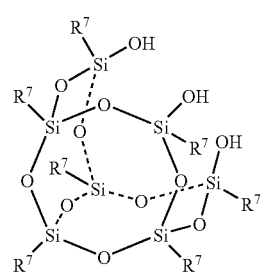 (VII)

-continued

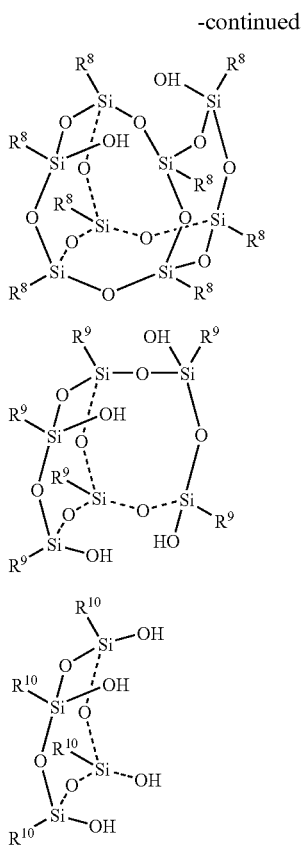

(VIII)

(IX)

(X)

wherein $R^7$, $R^8$, $R^9$ and $R^{10}$ are independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety.

In one embodiment, the siloxane compound comprises at least one compound having formula (XI);

$$M_a D_b T_c Q_d \quad \text{(XI)}$$

wherein the subscripts "a", "b", "c", and "d" are independently at each occurrence an integer from 0 to 100, with the proviso that the sum of the subscripts b, c and d is one or greater; M has formula (XII);

$$R^{11}{}_3 SiO_{1/2} \quad \text{(XII)}$$

D has formula (XIII);

$$R^{12}{}_2 SiO_{2/2} \quad \text{(XIII)}$$

T has formula (XIV);

$$R^{13} SiO_{3/2} \quad \text{(XIV)}$$

and Q has formula (XV);

$$SiO_{4/2} \quad \text{(XV)}$$

wherein $R^{11}$, $R^{12}$ and $R^{13}$ are independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety.

Silsesquioxanes are available commercially from Aldrich Chemical Co, Gelest Inc., or may be synthesized by methods known to those of ordinary skill in the art. Thus, by way of example, in some embodiments of the invention, the silsesquioxanes may be produced by base-catalyzed hydrolysis and condensation of alkyltrihalosilanes or alkyltrialkoxysilanes.

In one embodiment, the siloxane compound comprises at least one linear siloxane having formula (XVI);

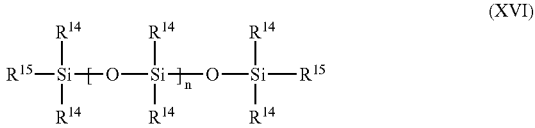

(XVI)

wherein "n" is an integer from 0 to 1000; $R^{14}$ is independently at each occurrence a hydrogen atom, a $C_1$-$C_{20}$ aliphatic radical, a $C_3$-$C_{40}$ aromatic radical, or a $C_3$-$C_{40}$ cycloaliphatic radical; and $R^{15}$ is independently at each occurrence a hydrogen atom, a hydroxyl group, a $C_1$-$C_{20}$ aliphatic radical, a $C_3$-$C_{40}$ aromatic radical, or a $C_3$-$C_{40}$ cycloaliphatic radical.

In one embodiment, the linear siloxane (XVI) comprises at least one of decamethyltetrasiloxane, dodecamethylpentasiloxane, tetradecamethylhexasiloxane, dihydroxy-terminated polydimethylsiloxane, or divinyl-terminated polydimethylsiloxane. In one embodiment, the linear siloxane (XVI) comprises at least one vinyl-terminated polydimethylsiloxane having a molecular weight in a range from about 500 grams per mole to about 100,000 grams per mole. In another embodiment, the linear siloxane (XVI) comprises at least one vinyl-terminated polydimethylsiloxane having a molecular weight in a range from about 2500 grams per mole to about 50,000 grams per mole. In yet another embodiment, the linear siloxane (XVI) comprises at least one vinyl-terminated polydimethylsiloxane having a molecular weight in a range from about 5000 grams per mole to about 25,000 grams per mole. Here and throughout the specification and claims, range limitations may be combined and/or interchanged. Such ranges as identified include all the sub-ranges contained therein unless context or language indicates otherwise.

The miscibility of the siloxane compound and its efficiency as a cross-link promoter may be determined by the total concentration of the siloxane compound in the composition. In one embodiment, the siloxane compound is present in an amount corresponding to from about 0.1 weight percent to about 50 weight percent of the thermoplastic polymer in the composition. In another embodiment, the siloxane compound is present in an amount corresponding to from about 1 weight percent to about 25 weight percent of the thermoplastic polymer. In yet another embodiment, the siloxane compound is present in an amount corresponding to from about 2.5 weight percent to about 10 weight percent of the thermoplastic polymer.

In one embodiment, the siloxane compound may have one or more of high thermal stability, low toxicity, high efficiency to cross-linking reactions, or compatibility with the thermoplastic polymeric material.

In one embodiment, the thermoplastic polymeric material comprises a polycarbonate having formula (XVII);

(XVII)

wherein 's' is an integer from 10 to 10,000; and $R^{16}$ is a divalent $C_2$-$C_{20}$ aliphatic radical, a divalent $C_3$-$C_{40}$ aromatic radical, or a divalent $C_3$-$C_{40}$ cycloaliphatic radical.

In some embodiments, $R^{16}$ may be derived from a dihydroxy aliphatic compound, a dihydroxy cycloaliphatic compound or a dihydroxy aromatic compound.

In one embodiment, $R^{16}$ is a divalent $C_3$-$C_{40}$ aromatic radical derived from a dihydroxy aromatic compound having formula (XVIII);

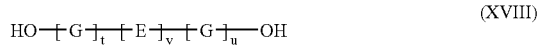

(XVIII)

wherein each G is independently at each occurrence a $C_3$-$C_{40}$ aromatic radical; E is independently at each occurrence a bond, a $C_1$-$C_{20}$ aliphatic radical, a $C_3$-$C_{40}$ cycloaliphatic radical, a $C_3$-$C_{40}$ aromatic radical, a sulfur-containing linkage, a selenium-containing linkage, a phosphorus-containing linkage, or an oxygen atom; "t" is a number greater than or equal to one; "v" is either zero or one; and "u" is a whole number including zero.

In certain embodiments, the dihydroxy aromatic compound is selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis (4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl) ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl) cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl) cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4- hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{1-3}$ alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and mixtures thereof. Dihydroxy aromatic compounds of formula (XVI) are commercially available or may be prepared by methods known to those skilled in the art.

In one embodiment, the dihydroxy aromatic compound is a bisphenol having formula (XIX):

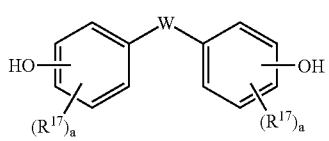

(XIX)

wherein $R^{17}$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical.

In one embodiment, $R^{16}$ of formula (XVII) is derived from bisphenol A (2,2-bis(4-hydroxyphenyl)propane, CAS No. 80-05-7) and the thermoplastic polymeric material is a Bisphenol A polycarbonate. Bisphenol A is available commercially from ALDRICH Chemical Co. Bisphenol A polycarbonate falls within generic formula (XVII) and represents the case wherein $R^{16}$ is derived from a bisphenol having formula (XIX), wherein "a" in formula (XIX) is equal to 0, W is an isopropylidene radical, and the hydroxyl groups are present at the 4,4' positions.

In another embodiment, $R^{16}$ of formula (XVII) is derived from bisphenol Z (4,4'-cyclohexylidenebisphenol, CAS No. 843-55-0) and the thermoplastic polymeric material is a Bisphenol Z polycarbonate. Bisphenol Z is available commercially from ALDRICH Chemical Co. Bisphenol Z polycarbonate falls within generic formula (XVII) and represents the case wherein $R^{16}$ is derived from a bisphenol having formula (XIX), wherein "a" in formula (XIX) is 0, W is a cyclohexylidene radical, and the hydroxyl groups are present at the 4,4' positions.

Examples of other polycarbonates which may be suitable for the method of the present invention include, but are not limited to, 2,2'-dimethylbisphenol Z polycarbonate, 2,2' dimethylbisphenol A polycarbonate, and bisphenol M polycarbonate.

Many suitable polycarbonates are commercially available and many others may be prepared by methods known in the art. Methods for preparation of polycarbonates include, but are not limited to, interfacial polymerization using for example phosgene; bischloroformate polymerization method using for example bisphenol A bischloroformate; and melt polymerization method using for example bisphenol A and a diaryl carbonate, such as diphenyl carbonate.

In one embodiment, the polycarbonate is a homopolymer i.e., containing structural units derived from the same dihydroxy compound. In one embodiment, the thermoplastic polymeric material comprises a co-polycarbonate i.e., comprises structural units derived from two or more of the dihydroxy compounds. In one embodiment, the co-polycarbonate comprises structural units derived from one or more of the dihydroxy aromatic compounds represented by formula (XIX). In one embodiment, the thermoplastic polymeric material comprises a co-polycarbonate comprising structural units having formula (XX):

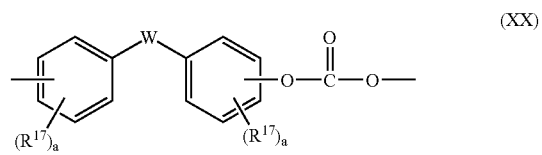

(XX)

wherein $R^{17}$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical. Those skilled in the art will understand that the term "co-polycarbonates comprising structural units (XX)" refers to co-polycarbonates comprising the structural units shown in structure (XX), and that the term is not intended to suggest that the co-polycarbonate must comprise "repeat units" having structure (XX).

In one embodiment, the thermoplastic polymeric material comprises a co-polycarbonate comprising bisphenol A polycarbonate structural units. In one embodiment, the thermoplastic polymeric material comprises a co-polycarbonate comprising bisphenol Z polycarbonate structural units. Both bisphenol A polycarbonate structural units and Bisphenol Z polycarbonate structural units fall within the ambit of structural units represented by formula (XX).

Many suitable co-polycarbonates are commercially available and many others may be prepared by methods known in the art. Methods for preparation of structural units of co-polycarbonates may be similar to preparation of polycarbonates and may include, but are not limited to, interfacial polymerization using for example phosgene; bischloroformate polymerization method using for example bisphenol A bischloroformate; and melt polymerization method using for example bisphenol A and a diaryl carbonate, such as diphenyl carbonate In one embodiment, the thermoplastic polymeric material comprises a co-polyestercarbonate comprising at least one polycarbonate block and at least one polyester block. In another embodiment, the thermoplastic polymeric material comprises a co-polyestercarbonate comprising a polyester block comprising structural units having formula (XXI):

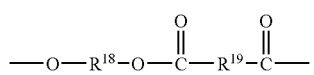

(XXI)

wherein $R^{18}$ is independently at each occurrence a divalent $C_2$-$C_{20}$ aliphatic radical, a divalent $C_3$-$C_{40}$ aromatic radical, or a divalent $C_3$-$C_{40}$ cycloaliphatic radical; and $R^{19}$ is independently at each occurrence a divalent $C_1$-$C_{20}$ aliphatic radical, a divalent $C_3$-$C_{40}$ aromatic radical, or a divalent $C_3$-$C_{40}$ cycloaliphatic radical. The structural units of formula (XXI) may be derived from a diol of formula (XXII) and diacid or diacid derivatives of formula (XXIII):

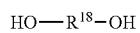

(XXII)

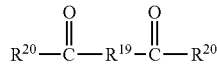

(XXIII)

wherein $R^{18}$ is a divalent $C_2$-$C_{20}$ aliphatic radical, a divalent $C_3$-$C_{40}$ aromatic radical, or a divalent $C_3$-$C_{40}$ cycloaliphatic radical; $R^{19}$ is a divalent $C_1$-$C_{20}$ aliphatic radical, a divalent $C_3$-$C_{40}$ aromatic radical, or a divalent $C_3$-$C_{40}$ cycloaliphatic radical; and $R^{20}$ is independently at each occurrence a hydroxyl, a halogen, a $C_1$-$C_{20}$ alkoxy group, or a $C_3$-$C_{20}$ aryloxy group.

Suitable diacids and diacid derivatives, for example diacids, diacid halides, diesters and acid esters, encompassed within formula (XXIII) include, but are not limited to decanedioic acid, undecanedioic acid, dodecanedioic acid, sebacic acid, adipic acid, suberic acid, oleic acid, azelaic acid, erucaic acid, brazzylic acid, isophthalic acid, terephthalic acid, malonic acid, malic acid, maleic acid, lactic acid, naphthalene-2,6-dicarboxylic acid, naphthalene-2,7-dicarboxylic acid, cyclohexane-1,4-dicarboxylic acid, biphenyl-3,4'-dicarboxylic acid biphenyl-4,4'-dicarboxylic acid, diphenylether-4,4'-dicarboxylic acid, diphenylsulfone-4,4'-dicarboxylic acid, diphenylketone-4,4'-dicarboxylic acid, diphenylsulfide-4,4'-dicarboxylic acid, diphenylmethane-4,4'-dicarboxylic acid, diphenyldichloromethane-4,4'-dicarboxylic acid, their corresponding diacid halides, diesters or acid esters and mixtures thereof.

The co-polyestercarbonates of the present invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065. In one embodiment, the co-polyestercarbonate comprises a polyester block comprising structural units represented by formula (XXII), which are derived from aliphatic diols or aliphatic diacids or diacid derivatives.

LEXAN SP is one example of such a co-polyestercarbonate incorporating structural units derived from bisphenol A and dodecanedioic acid. LEXAN SP is available commercially from GE Plastics, Pittsfield, Mass. Examples of other suitable co-polyestercarbonates and methods which may be used for preparing said copolyestercarbonates for use according to the present invention are found, for example in U.S. Pat. Nos. 4,238,596 and 4,238,597.

In one embodiment, the co-polyestercarbonate comprises a polyester block comprising structural units derived from at least one dihydroxy aromatic compound and at least one aromatic dicarboxylic acid residue. In one particular embodiment, the dihydroxy aromatic compound is derived from a 1,3-dihydroxybenzene having formula (XXIV), commonly referred to as resorcinol or a resorcinol derivative.

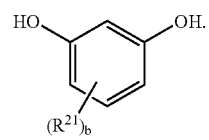

(XXIV)

In formula (XXIV), "b" is independently at each occurrence an integer from 0 to 4 and $R^{21}$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical. Resorcinol or resorcinol derivative as used within the context of the present invention should be understood to include both unsubstituted 1,3-dihydroxybenzene and substituted 1,3-dihydroxybenzenes unless explicitly stated otherwise.

Suitable aromatic dicarboxylic acid residues include aromatic dicarboxylic acid residues derived from monocyclic aromatic diacid compounds, including isophthalic acid, terephthalic acid, or mixtures of isophthalic and terephthalic acids, or from polycyclic aromatic diacid compounds. In various embodiments the aromatic dicarboxylic acid residues may be represented by formula (XXV).

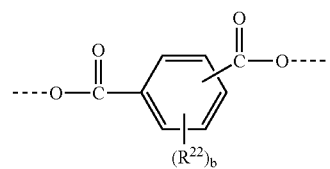

(XXV)

In formula (XXV), "b" is independently at each occurrence an integer from 0 to 4 and $R^{22}$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical. The aromatic dicarboxylic acid residues are typically derived from the corresponding acids, acid halides and esters. In one embodiment, the aromatic dicarboxylic acid residues are derived from a mixture of isophthaloyl chloride ($C_8H_4O_2Cl_2$) and terephthaloyl chloride ($C_8H_4O_2Cl_2$).

For convenience, polyesters comprising structural units derived from resorcinol or a resorcinol derivative (XXIV) and iso- and terephthlate and residues (XXV) are referred to as "ITR polymers", or simply "ITR's". Therefore, in one particular embodiment, the thermoplastic polymeric material comprises co-polyestercarbonates comprising ITR structural units of formula (XXVI):

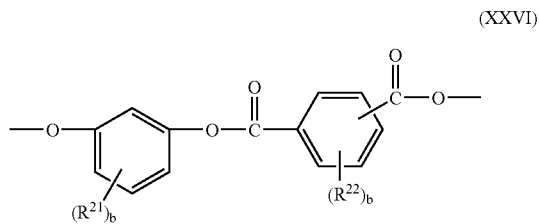

wherein $R^{21}$ and $R^{22}$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "b" is independently at each occurrence an integer from 0 to 4.

In one embodiment, the copolyestercarbonate comprises polyester blocks and polycarbonate blocks. The co-polyestercarbonates are typically prepared by reacting a hydroxy-terminated polyester intermediate (for example a hydroxy-terminated ITR intermediate) with a dihydroxy-substituted aromatic compound (e.g. a bisphenol such as bisphenol A) and phosgene under interfacial conditions. The hydroxy-terminated polyester intermediate can be prepared by methods known to those skilled in the art.

In one embodiment, the hydroxy-terminated polyester intermediate is prepared by reacting a dihydroxy aromatic compound such as resorcinol with one or more aromatic diacid chlorides (e.g. isophthaloyl dichloride and terephthaloyl dichloride) in a reaction mixture comprising water and at least one organic solvent substantially immiscible with water (i.e. under interfacial conditions). Control of the molecular weight of the hydroxy-terminated polyester may be exerted by increasing the molar ratio of the dihydroxy-substituted aromatic compound to the diacid chloride employed, and by decreasing the amount of water present in the reaction mixture. Enhanced control of the molecular weight of the hydroxy-terminated polyester intermediate may thus be achieved with or without the use of an endcapping agent.

In one embodiment, the present invention provides a method for improving the abrasion resistance of a plastic article. The method comprises: providing a composition comprising decamethylcyclopentasiloxane and at least one resorcinol-based polyarylate-polycarbonate copolymer; (b) forming an article from the composition of step (a); and (c) exposing the article formed in step (b) to an electron-beam source. Resorcinol-based polyarylate-polycarbonate copolymers are polyarylate comprising at least one structural unit derived from resorcinol or a derivative of resorcinol.

The composition comprising at least one siloxane compound and at least one thermoplastic polymeric material may additionally contain additives known to those skilled in the art, including pigments, dyes, impact modifiers, UV screeners, flame retardants, fillers, stabilizers, flow aids, ester interchange inhibitors, and mold release agents The compositions of the present invention may be prepared or provided by mixing or blending an appropriate amount of a siloxane compound with a thermoplastic polymeric material with any other additives. Methods of mixing or blending include, but are not limited to, melt mixing in a single screw or twin-screw extruder, mixing the components of the blend and composition as powders on a two-roll mill, in a Banbury mixer, in a paint shaker or in a coffee grinder.

In some embodiments, one or more components or additives can be added to the composition as an aqueous mixture or solution followed by devolatilization in appropriate processing equipment such as in an extruder. In another embodiment, some of the components may be mixed in aqueous solution and then evaporated to form a material which can be added to the remaining components.

In one embodiment, after blending, the composition may optionally be then reduced to a particulate form for example by pelletizing or grinding the composition. In one embodiment, the compositions of the present invention may be molded into useful shaped articles by a variety of means such as injection molding, extrusion, rotational molding, blow molding and thermoforming to form articles such as films or multilayered structures.

In one embodiment, the composition comprising at least one siloxane compound and at least thermoplastic polymeric material is extruded to form an article, which is a film. In one embodiment, the film has a thickness in a range from about 10 microns to about 1000 microns. In another embodiment, the film has a thickness in a range from about 100 microns to about 800 microns. In yet another embodiment, the film has a thickness in a range from about 200 microns to about 600 microns.

In one embodiment, a multilayer article is formed from the composition comprising at least one siloxane compound and at least one thermoplastic polymeric material. The multilayer article comprises a substrate layer and a coating layer thereon. The substrate layer comprises a thermoplastic polymer, a thermoset polymer, cellulosic material, glass, ceramic, or metal. The coating layer comprises at least one siloxane compound and least one thermoplastic polymeric material selected from the group consisting of polycarbonates, co-polycarbonates, and co-polyestercarbonates. Optionally, the multilayer articles may further comprise an interlayer, for example an adhesive interlayer, between any substrate layer and any coating layer. Multilayer articles of the invention include, but are not limited to, those which comprise a substrate layer and a coating layer; those which comprise a substrate layer with a coating layer on each side of said substrate layer; and those which comprise a substrate layer and at least one coating layer with at least one interlayer between a substrate layer and a coating layer. The interlayer layer may be transparent and/or may contain an additive, for example a colorant or decorative material such as metal flake. The substrate layer, the coating layer, and any interlayers are preferably in contiguous superposed contact with one another.

The material of the substrate layer in the articles of this invention may be at least one second polymeric material, whether addition or condensation prepared. Suitable condensation polymers include, but are not limited to, polycarbonates, particularly aromatic polycarbonates, polyphenylene ethers, polyetherimides, polyesters, co-polyestercarbonates, and polyamides. In one embodiment, the substrate layer comprises at least one second polymeric material selected from the group consisting of polycarbonates, co-polycarbonates and co-polyestercarbonates. The second polymeric material is different from the thermoplastic polymeric material of the composition comprising a siloxane compound and a thermoplastic polymeric material.

Suitable polycarbonates (PC) and co-polycarbonates for use as substrates include polycarbonates and co-polycarbonates comprising structural units derived from at least one dihydroxy aromatic compound having formula (XVIII). The most preferred polycarbonates are bisphenol A homo- and co-polycarbonates of bisphenol A. The polycarbonate substrate may also be a co-polyestercarbonate. Such copolymers typically comprise, in addition to the organic carbonate units, ester units such as isophthalate and/or terephthalate and may comprise structural units of formula (XIX). Polyester substrates include, but are not limited to, poly(ethylene terephthalate) (PET), poly(1,4-butylene terephthalate) (PBT), poly (trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly (vinyl alcohol), poly(vinyl butyral), poly(acrylonitrile), acrylic polymers such as those of (meth)acrylamides or of alkyl(meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, polymethyl methacrylate/acrylic rubber, polyphenylene ether/polystyrene, polyphenylene ether/polyamide or polyphenylene ether/polyester.

In one embodiment, the substrate layer in the multilayer article may comprise at least one of a thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, ureaformaldehyde, benzocyclobutanes, hydroxymethylfurans, and isocyanates. In one embodiment, the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment, a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In one embodiment, the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

In one embodiment, the multilayer article comprises at least one glass layer as substrate layer. In one embodiment, the multilayer article comprises at least one metal layer as substrate layer. Representative metal substrates include those comprising brass, copper, and other metals or metal-containing articles, which might abrade.

Depending upon the nature of substrate and coating layers, at least one adhesive interlayer may be beneficially employed between any substrate layer and any coating layer. The adhesive interlayer may be transparent, opaque or translucent. For many applications it is preferred that the interlayer be optically transparent in nature and generally have a transmission of greater than about 60% and a haze value less than about 3% with no objectionable color.

In one embodiment, application of said coating layer comprises fabrication of a separate sheet thereof followed by application to the substrate layer, or by simultaneous production of both layers, typically in a melt process. Thus, there may be employed such methods as co-injection molding, coextrusion, overmolding, blow molding, multi-shot injection molding and placement of a film of the coating layer material on the surface of the substrate layer followed by adhesion of the two layers, typically in an injection molding apparatus; e.g., in-mold decoration, or in a hot-press. In one embodiment, application of the at least one coating layer may be performed by solvent-casting.

It is also within the scope of the invention to apply a structure comprising the coating layer and the substrate layer to a second substrate layer, which is generally of a thermoplastic, thermoset, or cellulosic material similar or identical to that of the substrate layer but different from that of the coating layer. This may be achieved, for example, by charging an injection mold with the structure comprising the coating layer and the substrate layer and injecting the second substrate material behind it. By this method, in-mold decoration and the like are possible. Both sides of the second substrate layer may receive the other layers, though it is usually preferred to apply them to only one side.

In one embodiment, the coating layer comprising the composition comprising a siloxane compound and a thermoplastic polymeric material has a thickness in a range from about 10 microns to about 1000 microns. In another embodiment, the coating layer comprising the composition comprising a siloxane compound and a thermoplastic polymeric material has a thickness in a range from about 100 microns to about 800 microns. In yet another embodiment, the coating layer comprising the composition comprising a siloxane compound and a thermoplastic polymeric material has a thickness in a range from about 200 microns to about 600 microns.

In one embodiment, the substrate layer comprising the second polymeric material has a thickness in a range from about 100 microns to about 2000 microns. In another embodiment, the substrate layer comprising the second polymeric material has a thickness in a range from about 200 microns to about 1600 microns. In yet another embodiment, the substrate layer comprising the second polymeric material has a thickness in a range from about 400 microns to about 1000 microns.

As noted, an article comprising a composition comprising a siloxane compound and a thermoplastic polymeric material is exposed to an electron beam (E-beam) source. Exposure to E-beam source introduces cross-links and/or chain scission and changes in polymer properties. The technique of exposure to E-beam source or E-beam irradiation is used in various applications such as television screens and is well-known to those of ordinary skill in the art. In one embodiment, E-beam irradiation comprises thermal emission of electrons from an electron emitting material such as tungsten; acceleration of the electrons emitted by application of voltage thereto; and focusing the beam by use of an electron field and/or transverse magnetic field. The E-beam irradiation may occur in ambient atmosphere conditions, in vacuum, or in an inert atmosphere. In one embodiment, the E-beam irradiation is conducted in the presence of nitrogen or hydrogen. In one embodiment, the E-beam irradiation is conducted in vacuum.

The acceleration voltage of the E-beam source determines the penetration depth of the E-beam. In one embodiment, the E-beam source has an operating voltage in the range from about 80 kV to about 20 MV. In another embodiment, the E-beam source has an operating voltage in the range from about 80 kV to about 1000 kV. In yet another embodiment, the E-beam source has an operating voltage in the range from about 80 kV to about 500 kV. In one particular embodiment, the electron beam source has an operating voltage of about 150 kV.

The change in properties of a plastic article upon exposure to E-beam radiation is determined by the E-bean dosage which is measured as energy per unit mass (e.g., 2.30 calories per gram equals one million rads, 1 Mrad). In one embodiment, exposure to an electron beam source results in an electron beam dosage in the range from about 1 Mrad to about 5000 Mrad. In another embodiment, exposure to an electron beam source results in an electron beam dosage in the range from about 1 Mrad to about 500 Mrad. In yet another embodiment, exposure to an electron beam source results in an electron beam dosage in the range from about 1 Mrad to about 200 Mrad.

In one embodiment, exposure to E-beam source results in change in one or more of glass transition temperatures, heat distortion temperatures, tensile strength/modulus, coefficient of thermal expansion, chemical resistance, or abrasion resistance.

In one embodiment, the present invention provides an article comprising an abrasion resistant surface. The article is prepared by a method comprising: (a) providing a composition comprising at least one siloxane compound and at least one thermoplastic polymeric material selected from the group consisting of polycarbonates, co-polycarbonates, and copolyestercarbonates; (b) forming an article from the composition of step (a); and (c) exposing the article formed in step (b) to an electron beam source.

The articles which can be prepared by the method of the present invention include, automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

EXAMPLES

Examples 1-19 and Comparative Examples 1-4

Materials: Siloxane compounds used in the examples were decamethylcyclopentasiloxane (D5), dodecamethylcyclohexasiloxane (D6), or 1,3,5,7-tetravinyl-1,3,5,7-tetramethylcyclotetrasiloxane (CVMS). These were obtained from Gelest Inc. (Morrisville, Pa., USA) and were used as received. Polymer materials used in the experiments were ITR-polycarbonate copolymers (SLX90/10) with the weight fraction of ITR block to the polycarbonate block in the polymer equal to 90:10. Unless otherwise mentioned, the SLX90/10 polymers were end-capped with phenol and were commercially available from GE Plastics. A commercial ITR-polycarbonate film (SGJ790) available from GE Plastics was used as a comparative polymer in some embodiments. In some embodiments, triallyl isocyanurate (TAIC) was used as a comparative cross-linking promoter, which was obtained from Aldrich Chemical Company (Milwaukee, Wis., USA) and was used as received. P-steel Current Gen, Thermoplastic film 1 and Thermoplastic film 2 were also used as benchmarks.

Film formation: Thermoplastic polymeric material and siloxane compounds or TAIC were dry blended using a coffee grinder and extruded into pellets at 285° C. and subsequently co-extruded into bi-layer films with polycarbonate containing carbon black at 275° C. Concentrations of the siloxane compounds and TAIC varied in the range from about 0.25 weight percent to about 5 weight percent. The thickness of the SLX layer was ~200-500 μm and that of polycarbonate was 400-1000 μm. The width of film was 18 cm.

E-beam irradiation: For e-beam irradiation experiments, equipment with 80-150 kV operating voltage at Advanced Electron Beams Inc. in Wilmington Mass. was used. 150 kV was used as a standard unless otherwise noted. The unit was capable of giving a 5 Mrad dose with each pass. Dosages higher than that were obtained by using multiple passes. E-beam dosages were changed from 0 to 400 Mrad. All the experiments were done under a nitrogen blanket with oxygen concentration of less than 300 ppm unless otherwise noted.

Mar performance measurements: Mar performance of the samples were studied using an Altas Crockmeter with 2 micron polishing paper (3M 281Q WETORDRY PRODUCTION™ Polishing Paper 2MIC) with a felt (Atlas 14995600) sandwiched in between. Mar severity was controlled by the numbers of cycles with a half, two or ten cycles used. A cycle strokes back and forth, and "half" means going one direction once. Two methods were used for the evaluation of mar performance:

(1) 20° gloss before and after the mar test was compared using gloss meter placed at center of a mar stripe. Two stripes or more were used to obtain the average and the standard deviation.

(2) Marred samples were visually compared to the standard samples under "Daylight 65" condition of "GretagMacbeth Spectralight III". The standard samples consist of polymers with different mar performances and they were marred with linen or paper with a different number of cycles to obtain different degree of mar damage severity (visual quality or VQ) as shown in Table 1. They were put into 0 (worst) to 10 (best) scales visually. From each test, four duplicates were made for each condition and the average and the standard deviation of these numbers were used for the evaluation. VQs obtained for these samples generally correspond well to the gloss retention obtained from 20°-gloss meter.

TABLE 1

VQ scale for mar damage

| VQ | Material | Mar fabric | # cycles |
|---|---|---|---|
| 10 | P-steel Next Gen | None | 0 |
| 9 | P-steel Current Gen | Linen | 0.5 |
| 7 | PMMA | Linen | 0.5 |
| 5 | Surlyn | 2 um paper | 2 |
| 3 | SLX (SGJ970) | 2 um paper | 0.5 |
| 1 | PC | 2 um paper | 10 |
| 0 | PMMA | 15 um paper | 20 |

Mar performance of the samples was determined for samples with different siloxane compounds, different concentrations of siloxane compounds, different SLX90/10 polymers, for different e-beam dosages, for different acceleration voltages and for different oxygen concentrations. The details of the compositions and the experimental conditions employed for Examples 1-19 and Comparative Examples 1-7 are tabulated in Table 2.

TABLE 2

| Example | Polymer | Cross-link promoter | Conc (wt %) | E-beam dosage (Mrad) | Voltage (kV) | N$_2$ |
|---|---|---|---|---|---|---|
| 1 | SLX90/10 | CVMS | 0.5 | 100 | 150 | Yes |
| 2 | SLX90/10 | CVMS | 2.0 | 0 | 150 | Yes |
| 3 | SLX90/10 | CVMS | 2.0 | 25 | 150 | Yes |
| 4 | SLX90/10 | CVMS | 2.0 | 50 | 150 | Yes |
| 5 | SLX90/10 | CVMS | 2.0 | 100 | 150 | Yes |
| 6 | SLX90/10 | CVMS | 2.0 | 200 | 150 | Yes |
| 7 | SLX90/10 | CVMS | 2.0 | 400 | 150 | Yes |
| 8 | SLX90/10 | CVMS | 2.0 | 100 | 150 | No |
| 9 | SLX90/10 | CVMS | 5.0 | 100 | 150 | Yes |

TABLE 2-continued

| Example | Polymer | Cross-link promoter | Conc (wt %) | E-beam dosage (Mrad) | Voltage (kV) | N$_2$ |
|---|---|---|---|---|---|---|
| 10 | SLX90/10 | D5 | 0.25 | 100 | 150 | Yes |
| 11 | SLX90/10 | D5 | 0.50 | 0 | 150 | Yes |
| 12 | SLX90/10 | D5 | 0.50 | 25 | 150 | Yes |
| 13 | SLX90/10 | D5 | 0.50 | 50 | 150 | Yes |
| 14 | SLX90/10 | D5 | 0.50 | 100 | 150 | Yes |
| 15 | SLX90/10 | D5 | 0.50 | 200 | 150 | Yes |
| 16 | SLX90/10 | D5 | 0.50 | 400 | 150 | Yes |
| 17 | SLX90/10 | D5 | 0.50 | 100 | 150 | Yes |
| 18 | SLX90/10 | D5 | 0.75 | 100 | 150 | Yes |
| 19 | SLX90/10 | D6 | 0.50 | 200 | 150 | Yes |
| 1* | SGJ790 | — | — | — | — | — |
| 2* | SGJ790 | — | — | 200 | 150 | Yes |
| 3* | SLX90/10 | — | — | 100 | 150 | Yes |
| 4* | SLX90/10 | TAIC | 2.0 | 200 | 150 | Yes |
| 5* | Thermoplastic Film 1 | — | — | — | — | — |
| 6* | Thermoplastic Film 2 | — | — | — | — | — |
| 7* | P-Steel Current Gen | — | — | — | — | — |

*Indicates Comparative Examples

Figure 2:
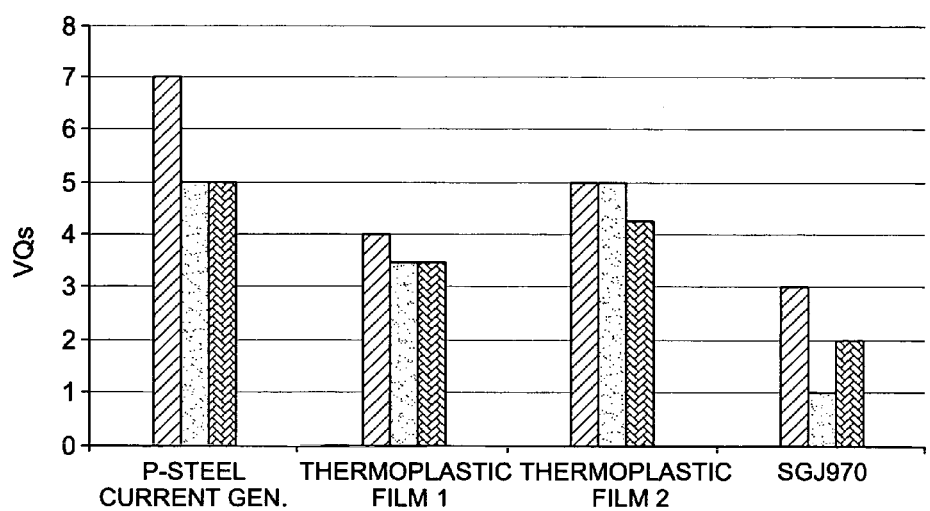
FIG. 2 presents visual qualities (VQs) results obtained after mar tests for Comparative Examples 1, 5, 6 and 7, in accordance with one embodiment of the invention.

The following comparisons are illustrative:

The comparisons between the benchmarks (Comparative Examples 5-7) and a commercial SLX film (Comparative Example 1) are illustrated in FIGS. 1 and 2. Comparative Example 6 demonstrates the highest mar resistance over wide damage regimes ranging from half cycle paper mar to ten cycles paper mar. Comparative Example 1, on the other hand, shows the lowest performance among these groups. The damage is especially severe with two-cycle test, showing only 67% gloss retention. The increase in gloss retention with ten-cycle paper mar is due to scraping of the material and resulting polishing of the surface. Thus, it does not reflect actual performance of mar resistance.

Figure 3:
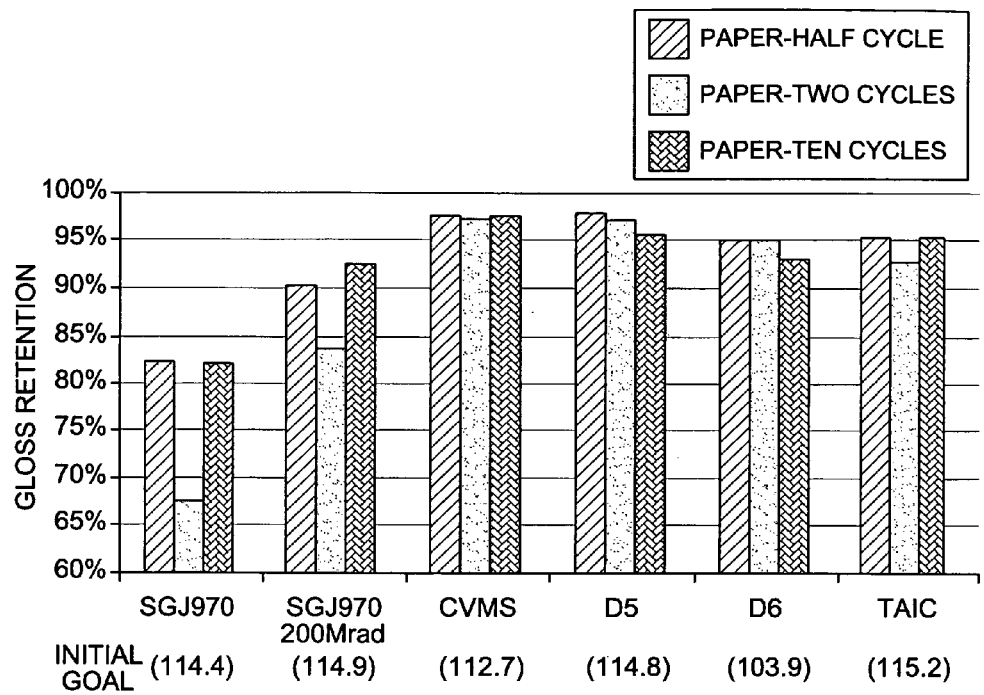
FIG. 3 presents gloss retention results obtained after mar tests for Examples 6, 15 and 19 versus Comparative Examples 1, 2 and 4, in accordance with one embodiment of the invention.
Figure 4:
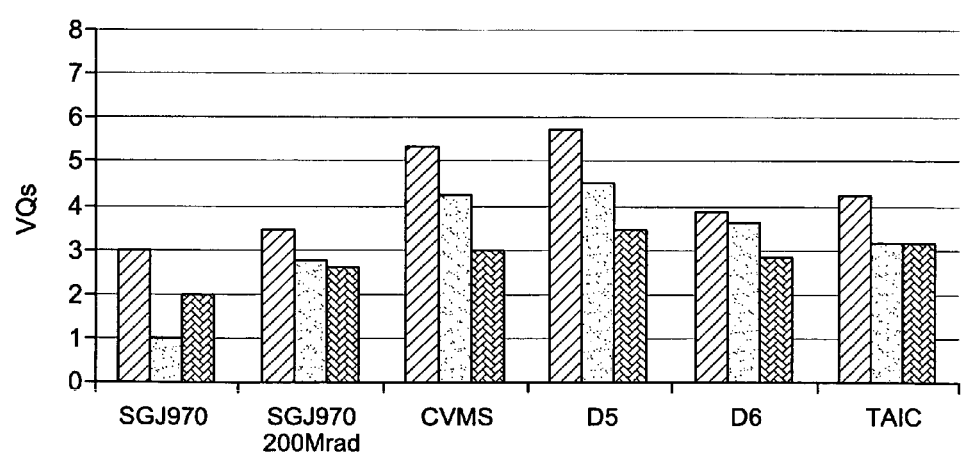
FIG. 4 presents visual qualities (VQs) results obtained after mar tests for Examples 6, 15, and 19 versus Comparative Examples 1, 2 and 4 in accordance with one embodiment of the invention.
Figure 5:
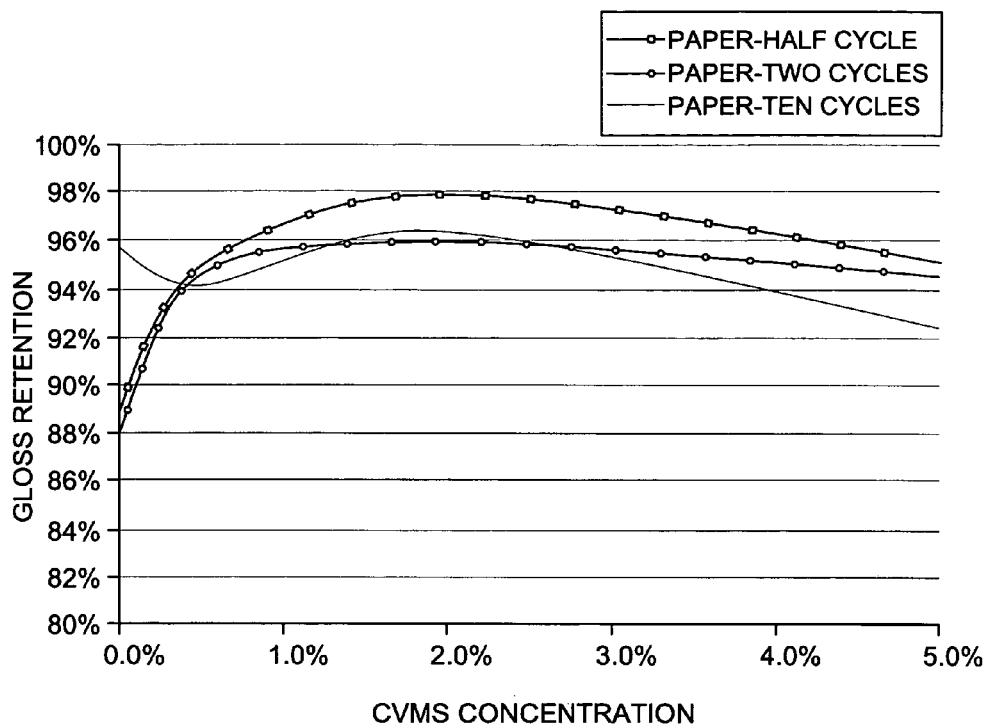
FIG. 5 presents gloss retention results obtained after mar tests for Examples 1, 5, and 9 versus Comparative Example 3, in accordance with one embodiment of the invention.
Figure 6:
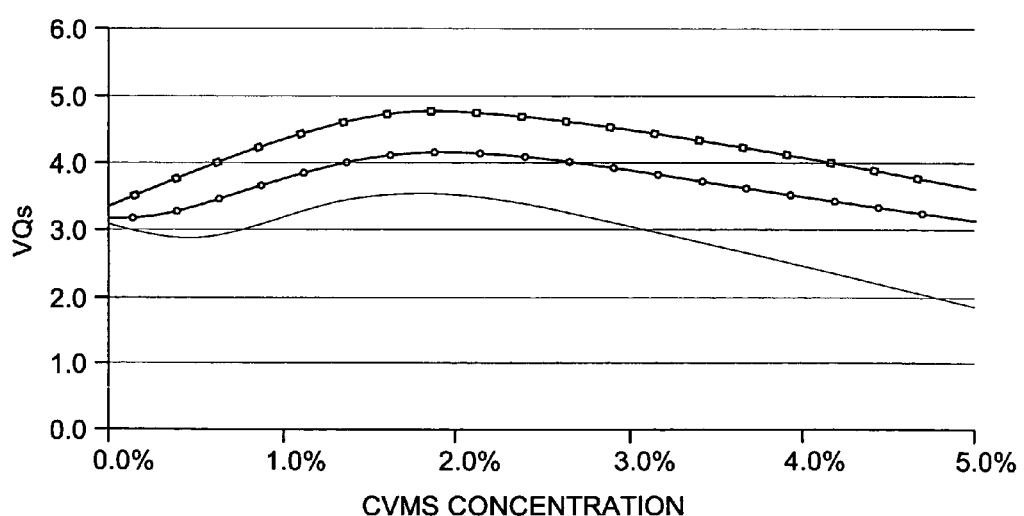
FIG. 6 presents visual qualities (VQs) results obtained after mar tests for Examples 1, 5, and 9 versus Comparative Example 3, in accordance with one embodiment of the invention.
Figure 7:
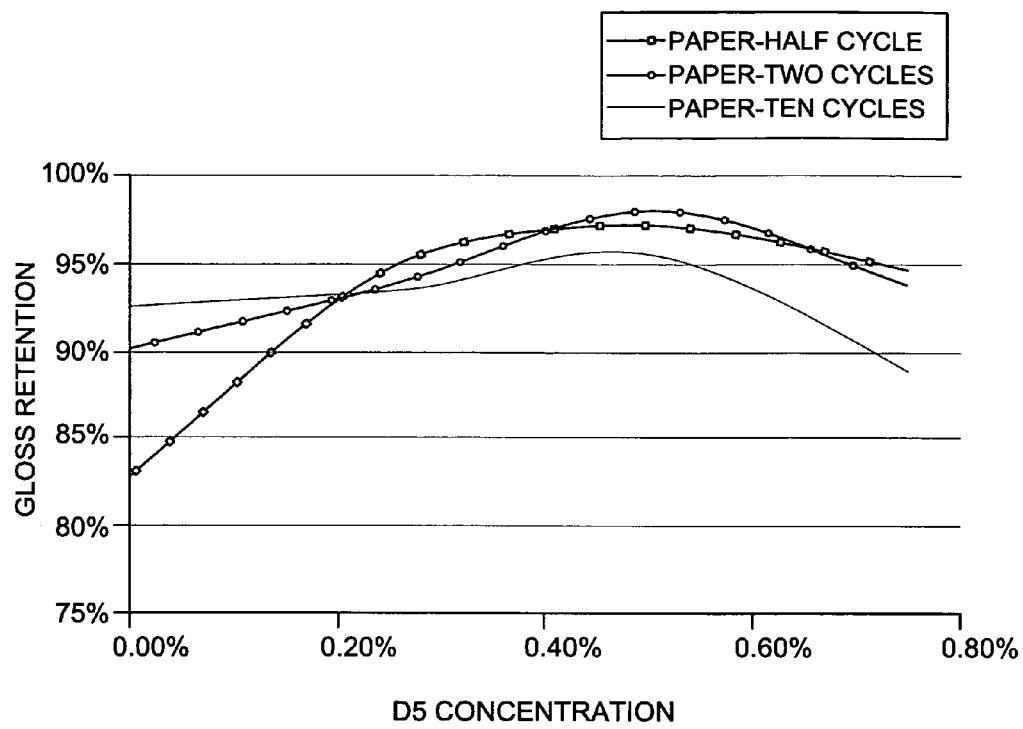
FIG. 7 presents gloss retention results obtained after mar tests for Examples 10, 14, and 18 versus Comparative Example 3, in accordance with one embodiment of the invention.
Figure 8:
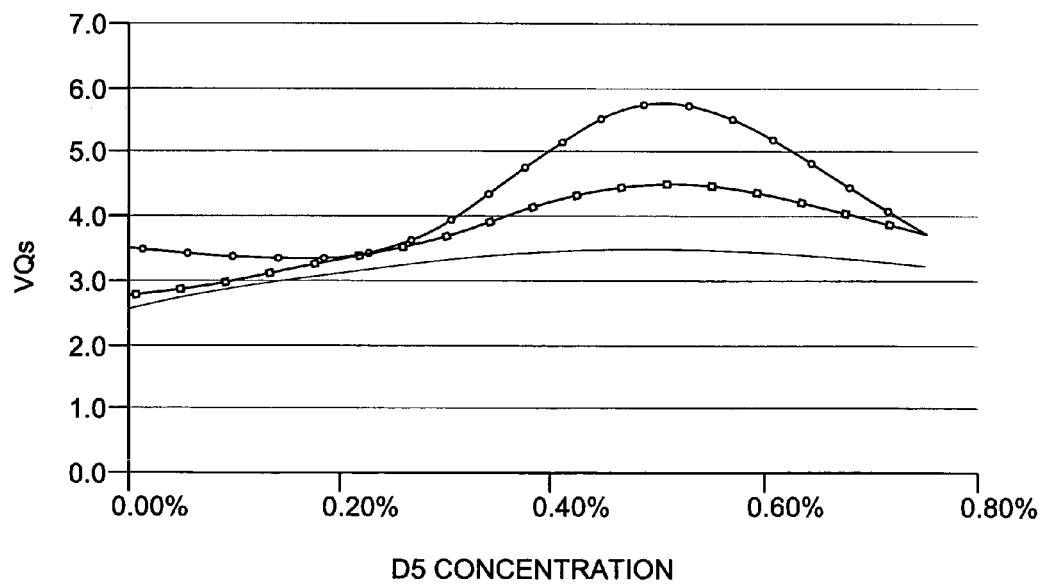
FIG. 8 presents visual qualities (VQs) results obtained after mar tests for Examples 10, 14, and 18 versus Comparative Example 3, in accordance with one embodiment of the invention.
Figure 9:
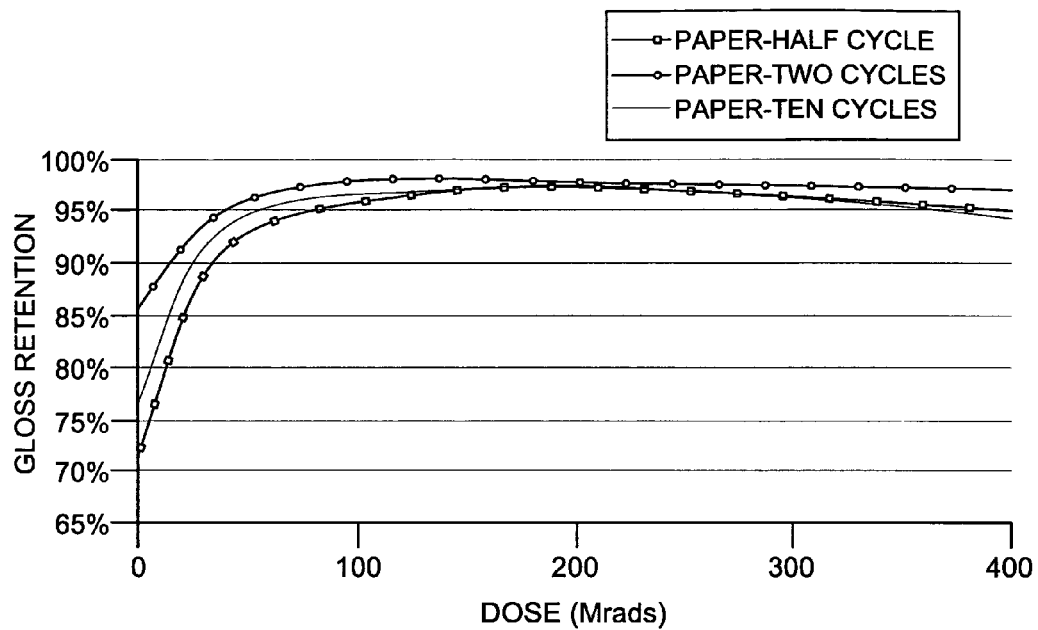
FIG. 9 presents gloss retention results obtained after mar tests for Examples 2-7, in accordance with one embodiment of the invention.
Figure 10:
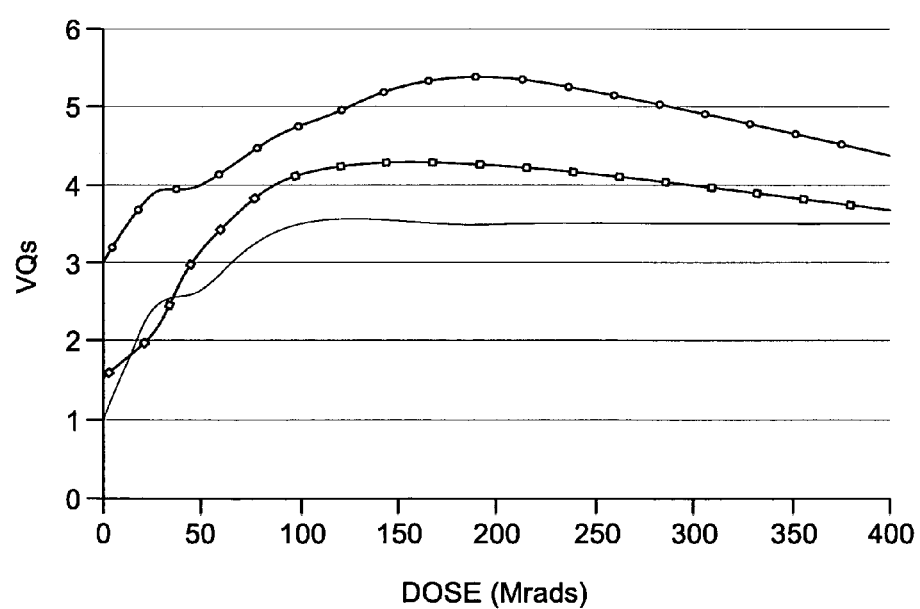
FIG. 10 presents visual qualities (VQs) results obtained after mar tests for Examples 2-7, in accordance with one embodiment of the invention.
Figure 11:
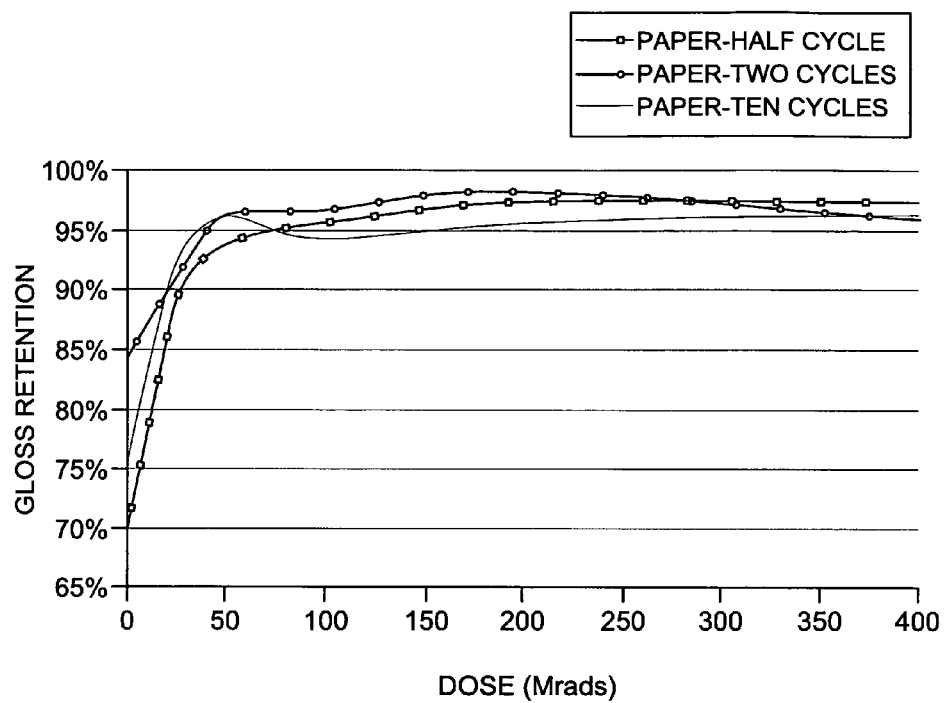
FIG. 11 presents gloss retention results obtained after mar tests for Examples 11-16, in accordance with one embodiment of the invention.
Figure 12:
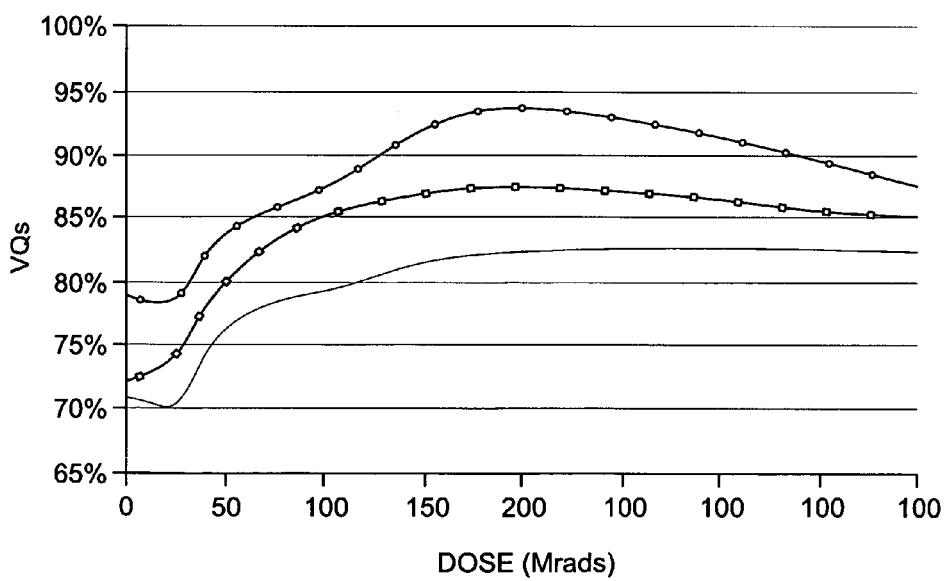
FIG. 12 presents visual qualities (VQs) results obtained after mar tests for Examples 11-16, in accordance with one embodiment of the invention.

The effect of E-beam irradiation and cross-link promoters on mar performance for the same experimental conditions is illustrated in FIGS. 3 and 4. Comparison of Examples 6, 15, and 19 versus Comparative Examples 1, 2, and 4 shows that the addition of cross-link promoters increased the gloss retention and VQs significantly compared to the SLX control (Comparative Examples 1 and 2). It was also observed that siloxane type promoters (Examples 6 and 15) improved the performance more than isocyanurate type promoters (Comparative Example 4). In Example 19, with just 0.5 wt %, the same level of mar performance improvement was observed as observed for Example 6 and Comparative Example 4. The degree of gloss retention and VQs were similar or better than benchmark thermoplastic films at half cycle and two cycle mar damages. Moreover, in Examples 6, 15 and 19, an initial gloss of ~114 was observed, which was significantly higher than the benchmarked thermoplastic films (Comparative Examples 5 and 6).

The effect of concentration of siloxane compounds on mar performance for the same experimental conditions is illustrated in FIGS. 5, 6, 7 and 8. Comparison of Examples 1, 5, and 9 versus Comparative Examples 3, shows effect of e-beam was enhanced with an increase in the CVMS concentration with a peak at 2 wt % (Example 5). Cross-linking reactions by e-beam irradiation in SLX may be enhanced by the presence of CVMS and the degree of the reaction increased with an increase of CVMS. Further increase in CVMS, however, may result in weakening of the effect of e-beam because of the plasticizing effect of CVMS. 10 wt % of TAIC was required to achieve the same level of improvement is mar performance as that obtained for Example 5.

A similar trend is observed with Examples 10, 14 and 18 and Comparative Example 3. Instead of 2 wt %, however, D5 reaches a maximum effect at 0.5 wt % (Example 14) D5 has a poorer compatibility with SLX and could form isolated domains without contributing to an increase in cross-link densities with concentration higher than 0.5%. These two results show the important role of the siloxane compound structure.

The effect of E-beam dosage on mar performance for the same concentration of siloxane compounds and at same acceleration voltage is illustrated in FIGS. 9, 10, 11 and 12. Comparison of Examples 2-7 showed that addition of CVMS itself did not change the mar performance (Example 2). The improvement was observed only after e-beam irradiation. The performance improved with an increase of the dose with a peak at 200 Mrad (Example 6). However, further exposure deteriorated their mar performances possibly due to the competitive chain scission reactions becoming dominant. A very similar trend was observed for Examples 11-16. Again, addition of D5 itself (Example 11) did not affect the mar performance of SLX. The effect was maximized at 200 Mrad (Example 15).

Figure 13:
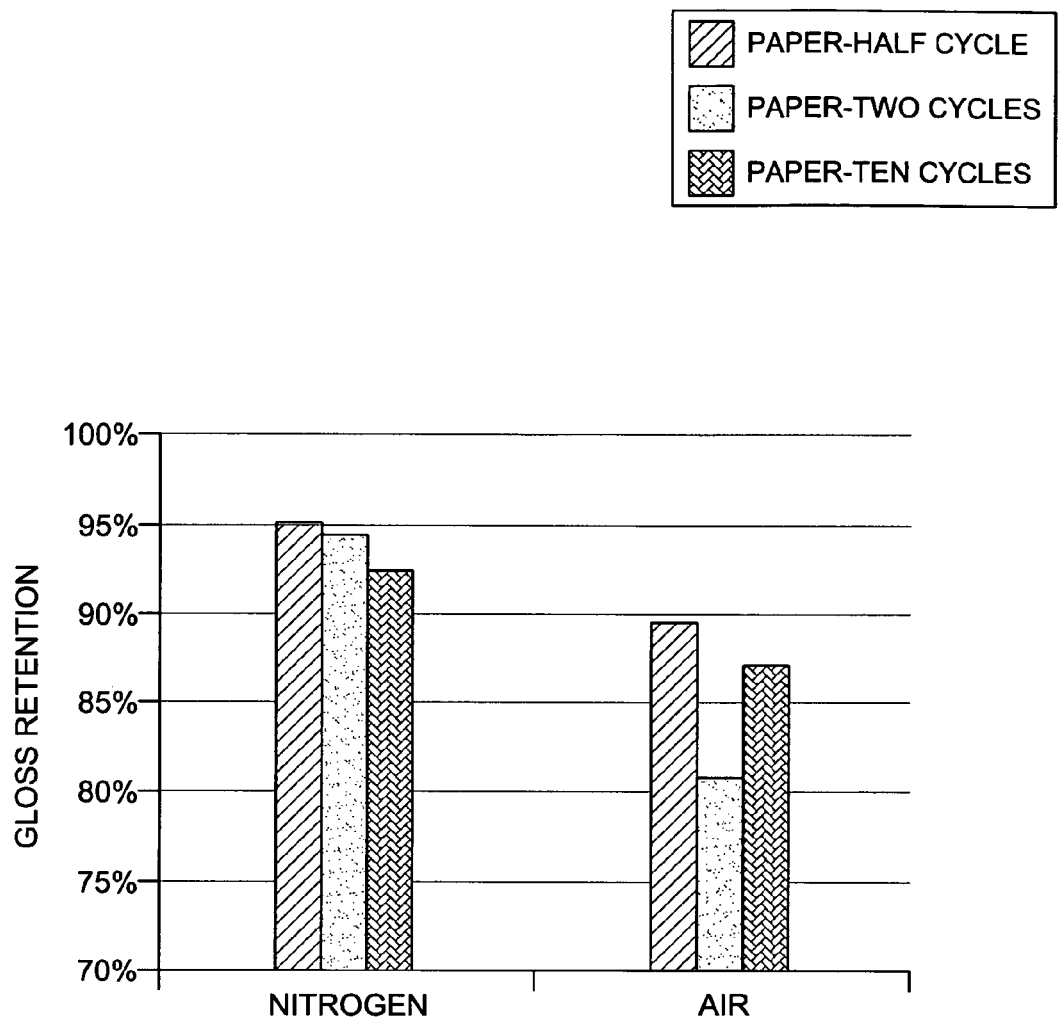
FIG. 13 presents gloss retention results obtained after mar tests for Examples 5 and 6, in accordance with one embodiment of the invention.

The effect of the E-beam irradiation conditions on mar performance for the same concentration of siloxane compounds and at same acceleration voltage is illustrated in FIG. 13. E-beam irradiation was conducted in an inert atmosphere (such as nitrogen) and in air. Comparison of Examples 5 and 8 shows that better gloss retention was obtained when E-beam irradiation was conducted in the presence of nitrogen.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A method for improving the abrasion resistance of a plastic article, said method comprising:
   (a) providing a composition comprising at least one siloxane compound and at least one thermoplastic polymeric material selected from the group consisting of polycarbonates, co-polycarbonates, and copolyestercarbonates, wherein said siloxane compound comprises at least one cyclic siloxane having formula (I);

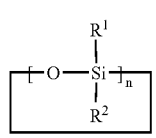

wherein "n" is an integer from 3 to 1000; and $R^1$ and $R^2$ are independently at each occurrence a hydrogen atom, a $C_1$-$C_{20}$ aliphatic radical, a $C_3$-$C_{40}$ aromatic radical, or a $C_3$-$C_{40}$ cycloaliphatic radical;

(b) forming an article from the composition of step (a); and
   (c) exposing the article formed in step (b) to an electron beam source.

2. The method according to claim 1, wherein said cyclic siloxane I comprises at least one of octamethylcyclotetrasiloxane, decamethylcyclopentasiloxane, dodecamethylcyclohexasiloxane, or 1,3,5,7-tetravinyl-1,3,5,7-tetramethylcyclotetrasiloxane.

3. The method according to claim 1, wherein said thermoplastic polymeric material comprises a polycarbonate having formula (XVII);

wherein 's' is an integer from 10 to 10,000; and $R^{16}$ is a divalent $C_2$-$C_{20}$ aliphatic radical, a divalent $C_3$-$C_{40}$ aromatic radical, or a divalent $C_3$-$C_{40}$ cycloaliphatic radical.

4. The method according to claim 3, wherein said polycarbonate is bisphenol A polycarbonate.

5. The method according to claim 1, wherein said thermoplastic polymeric material comprises a co-polycarbonate comprising structural units having formula (XX);

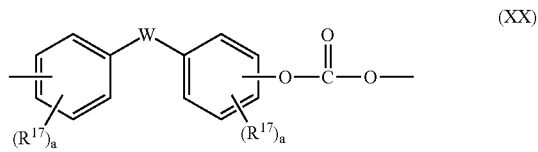

wherein $R^{17}$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical.

6. The method according to claim 1, wherein said thermoplastic polymeric material comprises a co-polyestercarbonate comprising structural units having formula (XXI):

$$-\!\!-\!\!O\!-\!\!R^{18}\!-\!\!O\!-\!\!\overset{\displaystyle O}{\underset{\displaystyle \|}{C}}\!-\!\!R^{19}\!-\!\!\overset{\displaystyle O}{\underset{\displaystyle \|}{C}}\!-\!\!- \quad (XXI)$$

wherein $R^{18}$ is independently at each occurrence a divalent $C_2$-$C_{20}$ aliphatic radical, a divalent $C_3$-$C_{40}$ aromatic radical, or a divalent $C_3$-$C_{40}$ cycloaliphatic radical; and $R^{19}$ is independently at each occurrence a divalent $C_1$-$C_{20}$ aliphatic radical, a divalent $C_3$-$C_{40}$ aromatic radical, or a divalent $C_3$-$C_{40}$ cycloaliphatic radical.

7. The method according to claim 6, wherein said co-polyestercarbonate comprises structural units having formula (XXVI);

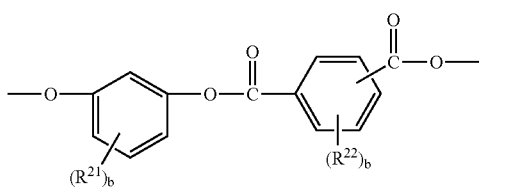

(XXVI)

wherein $R^{21}$ and $R^{22}$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and b is independently at each occurrence an integer from 0 to 4.

8. The method according to claim 1, wherein said siloxane compound is present in an amount corresponding to from about 0.1 weight percent to about 50 weight percent of the thermoplastic polymer.

9. The method according to claim 1, wherein said siloxane compound is present in an amount corresponding to from about 0.25 weight percent to about 10 weight percent of the thermoplastic polymer.

10. The method according to claim 1, wherein step (b) comprises extruding said composition to form an article, which is a film.

11. The method according to claim 10, wherein said film has a thickness in a range from about 100 microns to about 1000 microns.

12. The method according to claim 1, wherein step (b) comprises co-extruding extruding said composition with a second polymeric material to form a multi-layered article.

13. The method according to claim 12, wherein said second polymeric material is selected different from said thermoplastic polymeric material provided in step (a), and said second polymeric material is selected from the group consisting of polycarbonates, co-polycarbonates, copolyestercarbonates, and combinations thereof.

14. The method according to claim 1, wherein step (b) comprises solvent casting said composition to form a film.

15. The method according to claim 1, wherein said exposing is conducted in the presence of nitrogen or hydrogen.

16. The method according to claim 1, wherein said exposing is conducted in vacuum.

17. The method according to claim 1, wherein the electron beam source has an operating voltage in the range from about 80 kV to about 20 MV.

18. The method according to claim 1, wherein the electron beam source has an operating voltage of about 150 kV.

19. The method according to claim 1, wherein said exposing to an electron beam source results in an electron beam dosage in the range from about 1 Mrad to about 5000 Mrad.

20. A method for improving the abrasion resistance of a plastic article, said method comprising:

(a) providing a composition comprising decamethylcyclopentasiloxane and at least one resorcinol-based polyarylate-polycarbonate copolymer;
(b) forming an article from the composition of step (a); and
(c) exposing the article formed in step (b) to an electron beam source.

21. A method for improving the abrasion resistance of a plastic article, said method comprising:

(a) providing a composition comprising at least one siloxane compound and at least one thermoplastic polymeric material selected from the group consisting of polycarbonates, co-polycarbonates, and copolyestercarbonates, wherein said siloxane compound comprises at least one silsesquioxane having formula (VI);

$$(R^3SiO_{3/2})_n(O_{1/2}H)_m \qquad (VI)$$

wherein "n" is an integer from 2 to 100: "m" is an integer from 0 to 100: with the proviso that the sum of n+m is an even integer; and $R^3$ is independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety;

(b) forming an article from the composition of step (a); and
(c) exposing the article formed in step (b) to an electron beam source.

22. A method for improving the abrasion resistance of a plastic article, said method comprising:

(a) providing a composition comprising at least one siloxane compound and at least one thermoplastic polymeric material selected from the group consisting of polycarbonates, co-polycarbonates, and copolyestercarbonates, wherein said siloxane compound comprises at least one compound having formula (XI);

$$M_aD_bT_cQ_d \qquad (XI)$$

wherein the subscripts "a", "b", "c", and "d" are independently at each occurence an integer from 0 to 100, with the proviso that the sum of the subscripts b, c and d is one or greater; M has formula (XII);

$$R^{11}_3SiO_{1/2} \qquad (XII)$$

D has formula (XIII);

$$R^{12}_2SiO_{2/2} \qquad (XIII)$$

T has formula (XIV);

$$R^{13}SiO_{3/2} \qquad (XIV)$$

and Q has formula (XV);

$$SiO_{4/2} \qquad (XV)$$

wherein $R^{11}$, $R^{12}$ and $R^{13}$ are independently at each occurrence a hydrogen atom, a $C_1$-$C_{20}$ aliphatic radical, a $C_3$-$C_{40}$ aromatic radical, a $C_3$-$C_{40}$ cycloaliphatic radical, or an organosiloxane moiety;

(b) forming an article from the composition of step (a); and
(c) exposing the article formed in step (b) to an electron beam source.

* * * * *

UNITED STATES PATENT AND TRADEMARK OFFICE
CERTIFICATE OF CORRECTION

PATENT NO. : 7,576,140 B2  Page 1 of 1
APPLICATION NO. : 11/253115
DATED : August 18, 2009
INVENTOR(S) : Tamaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Seventh Day of September, 2010

David J. Kappos
*Director of the United States Patent and Trademark Office*